(No Model.) 9 Sheets—Sheet 1.

G. A. REYNOLDS.
AUTOMATIC RAILWAY GATE.

No. 553,541. Patented Jan. 28, 1896.

WITNESSES.
Rich. A. George.
A. E. Jones

INVENTOR.
GEORGE A. REYNOLDS
BY Kirby, Robinson & Love
ATTORNEY's.

(No Model.)  9 Sheets—Sheet 3.

G. A. REYNOLDS.
AUTOMATIC RAILWAY GATE.

No. 553,541. Patented Jan. 28, 1896.

Fig: 3.

WITNESSES.
Rich. A. George.
S. E. Jones

INVENTOR.
GEORGE A. REYNOLDS.
BY Risley, Robinson & Love
ATTORNEY'S.

(No Model.) 9 Sheets—Sheet 4.
G. A. REYNOLDS.
AUTOMATIC RAILWAY GATE.

No. 553,541. Patented Jan. 28, 1896.

WITNESSES.
Rich. A. George.
S. E. Jones

INVENTOR.
GEORGE A. REYNOLDS.
By Risley, Robinson & Love
ATTORNEY's

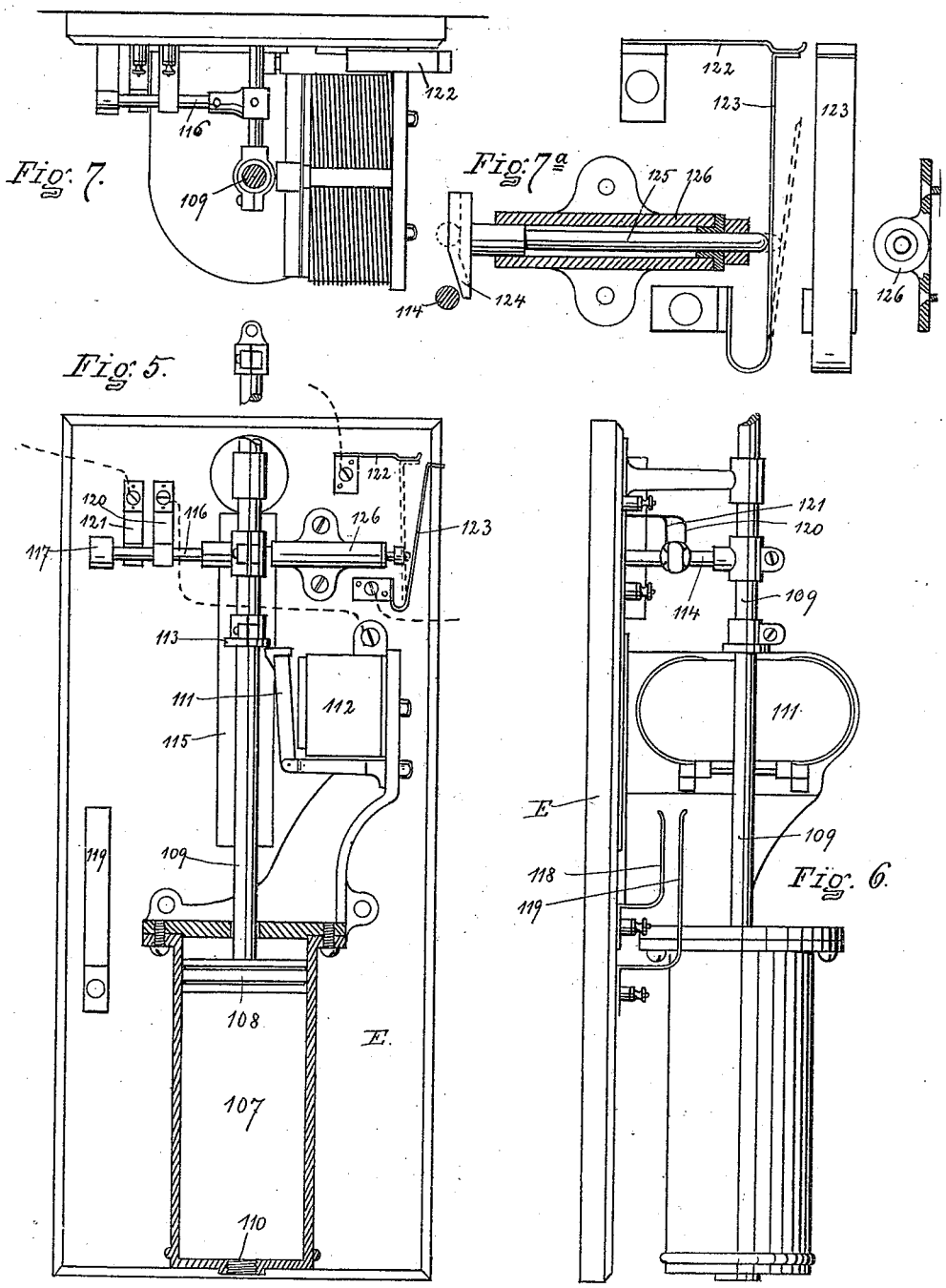

(No Model.) 9 Sheets—Sheet 6.

G. A. REYNOLDS.
AUTOMATIC RAILWAY GATE.

No. 553,541. Patented Jan. 28, 1896.

WITNESSES.
Rich. A. George.
S. E. Jones

INVENTOR.
GEORGE A. REYNOLDS.
By Risley, Robinson & Love
ATTORNEY'S

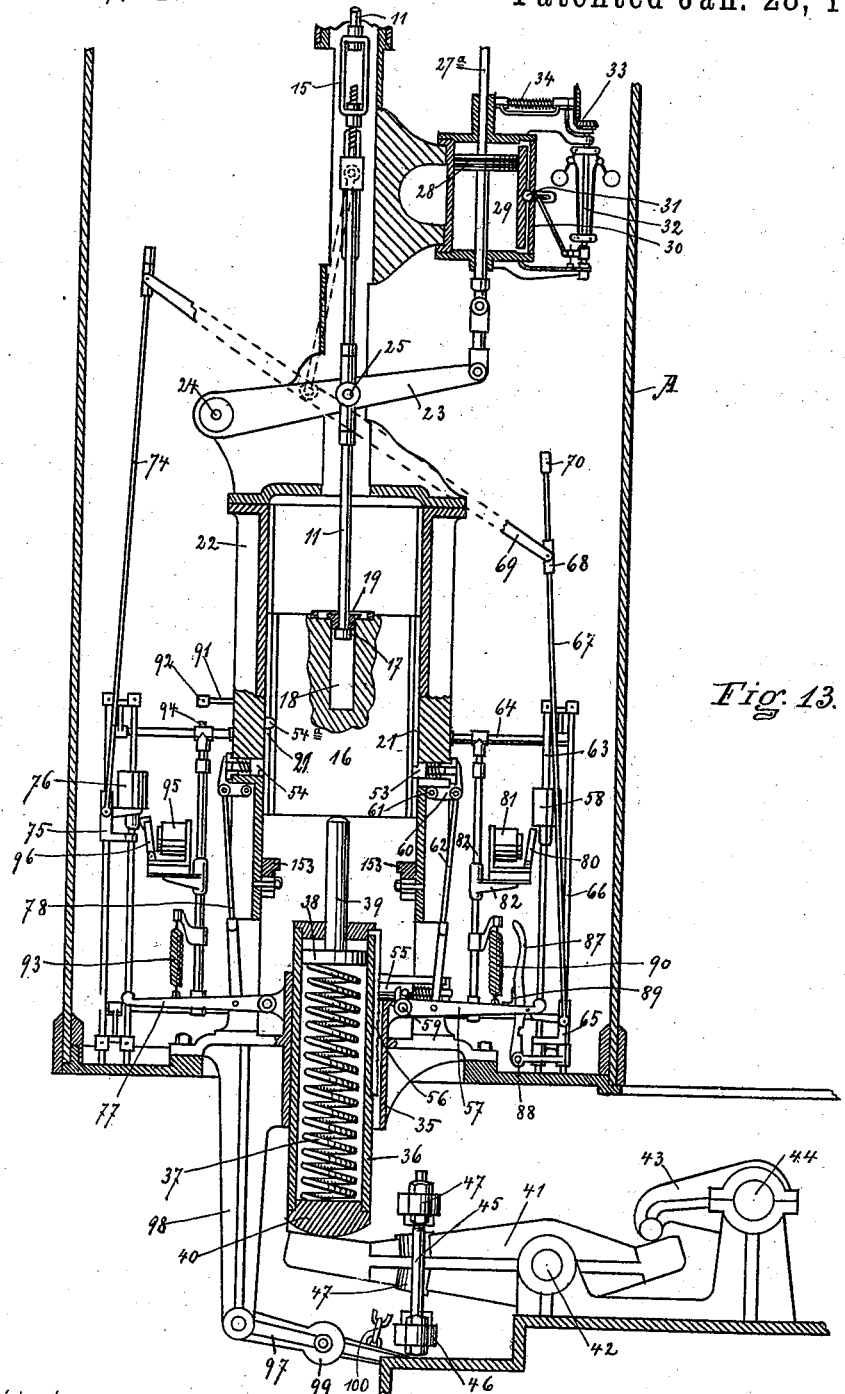

(No Model.) 9 Sheets—Sheet 8.
G. A. REYNOLDS.
AUTOMATIC RAILWAY GATE.
No. 553,541. Patented Jan. 28, 1896.
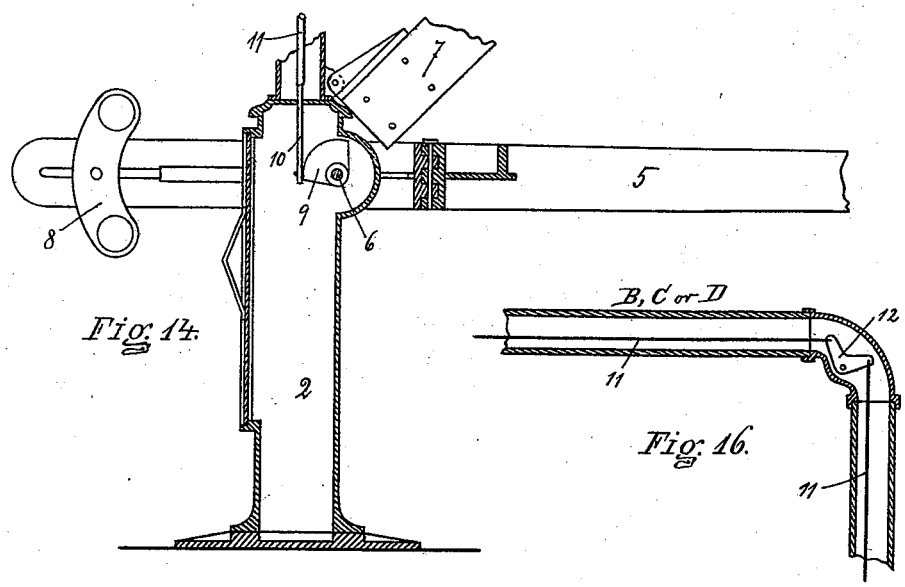
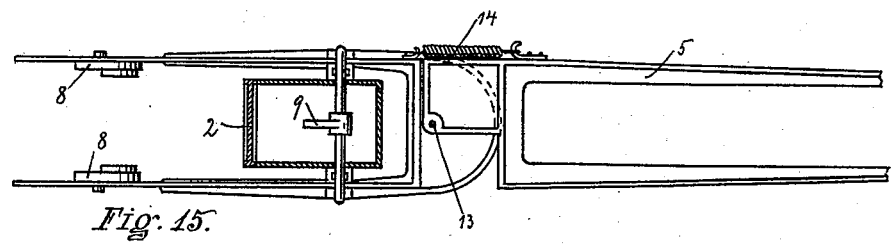
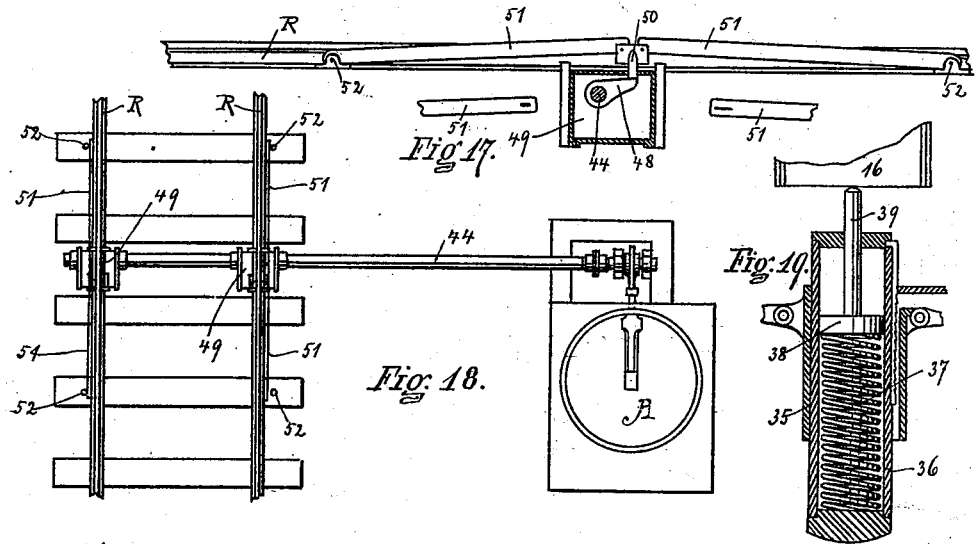
WITNESSES.
Rich. A. George
S. E. Jones
INVENTOR.
GEORGE A. REYNOLDS
By Risley, Robinson & Love
ATTORNEY'S

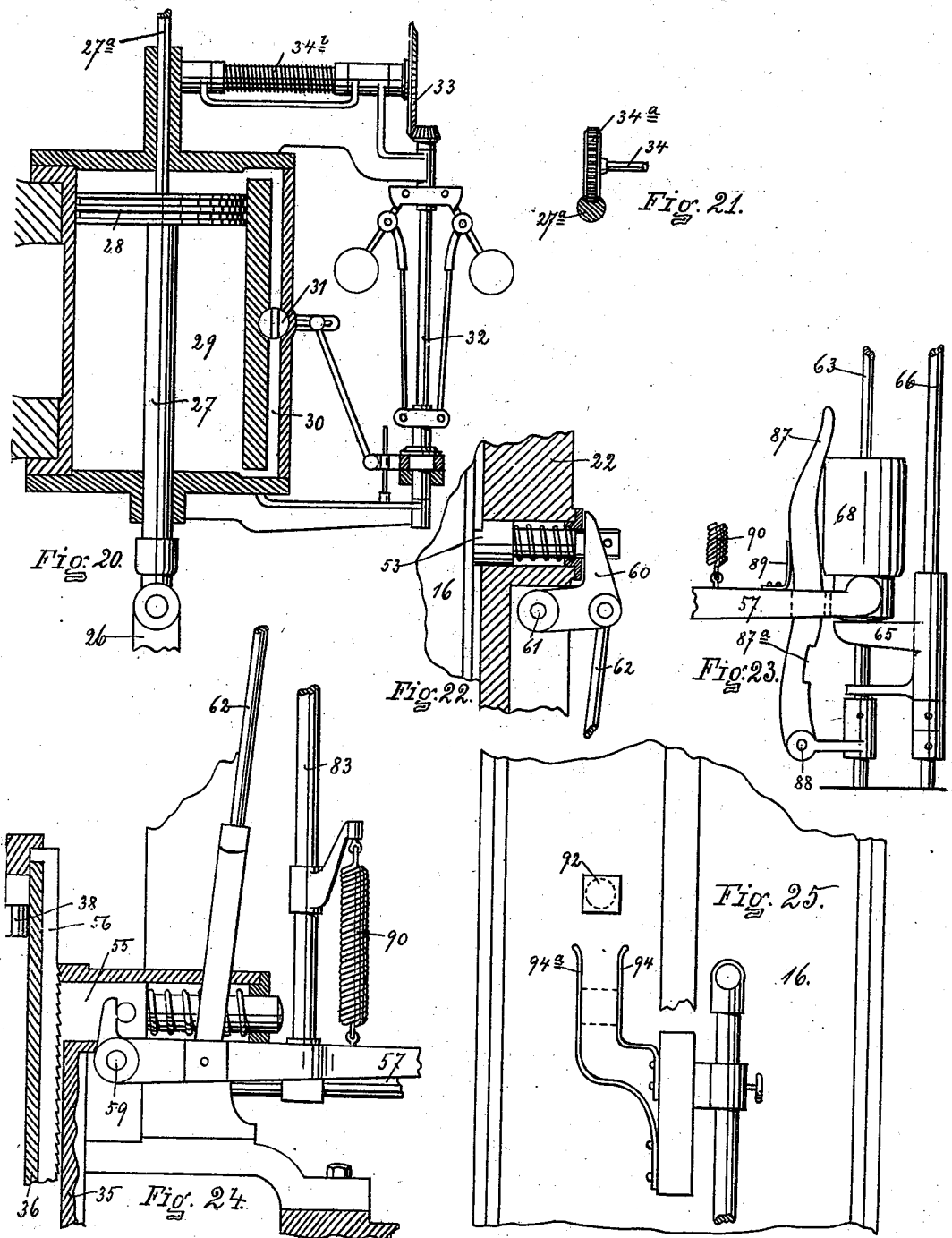

UNITED STATES PATENT OFFICE.

GEORGE A. REYNOLDS, OF UTICA, NEW YORK, ASSIGNOR TO THE REYNOLDS RAILWAY GATE COMPANY, OF MAINE.

AUTOMATIC RAILWAY-GATE.

SPECIFICATION forming part of Letters Patent No. 553,541, dated January 28, 1896.

Application filed February 5, 1894. Serial No. 499,067. (No model.)

*To all whom it may concern:*

Be it known that I, GEORGE A. REYNOLDS, of Utica, in the county of Oneida and State of New York, have invented certain new and useful Improvements in Automatic Railway-Gates; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an improvement in automatic railway-gates which are tripped through the medium of electricity and operated by tread-rails lying close to the railway-rails.

Figure 1:
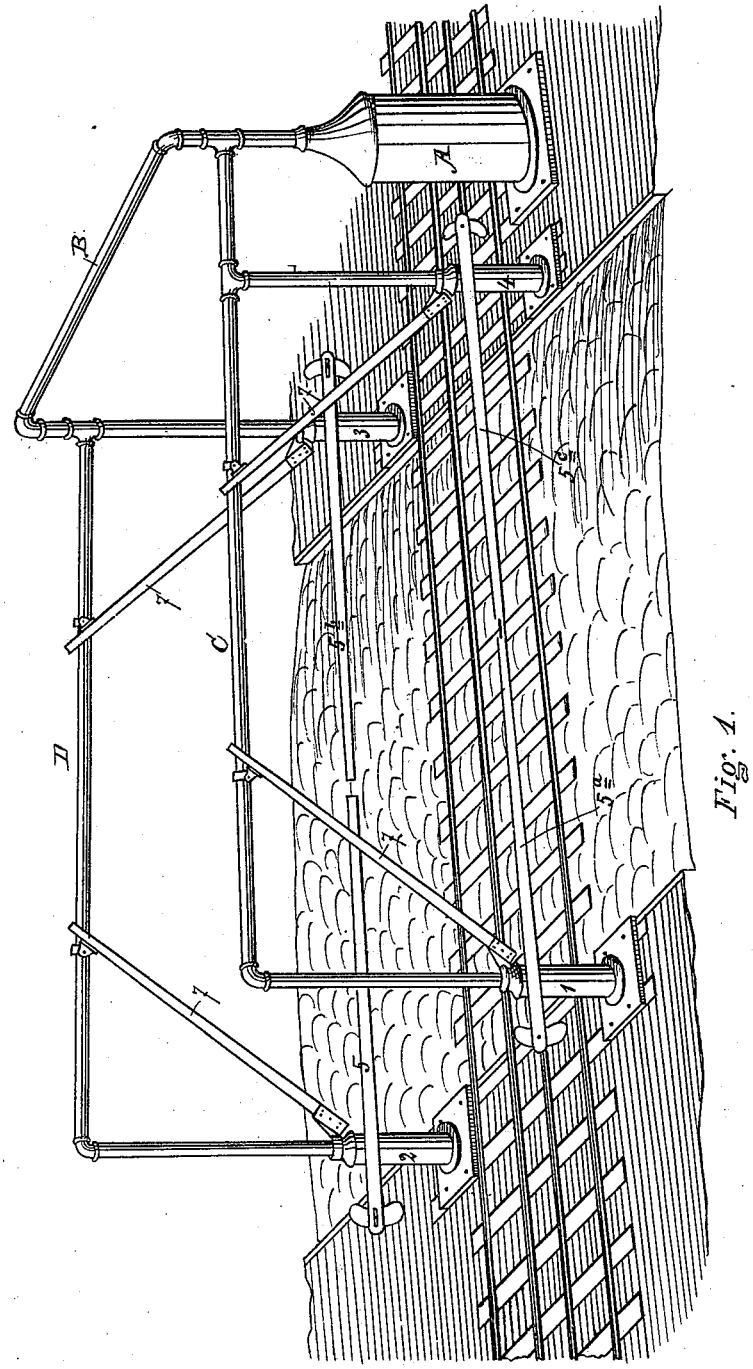
Figure 2:
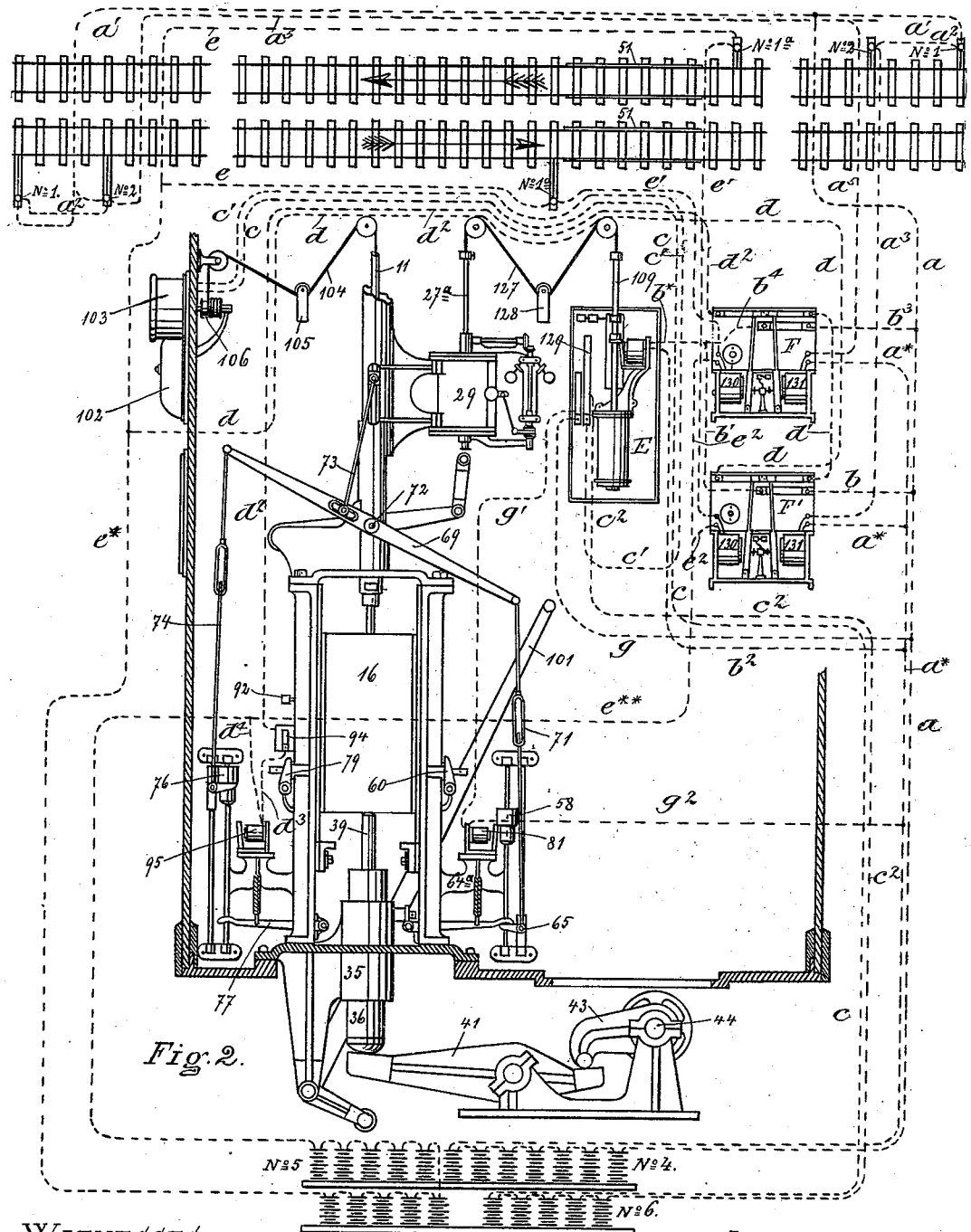
Figure 3:
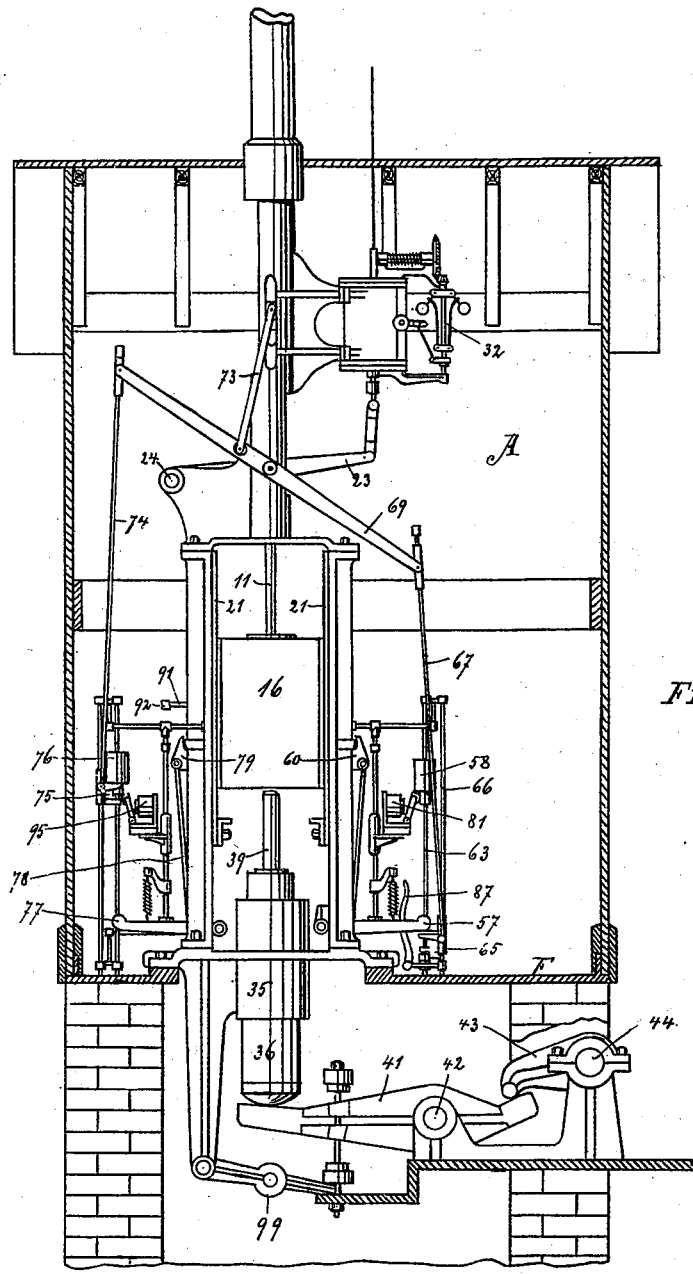
Figure 4:
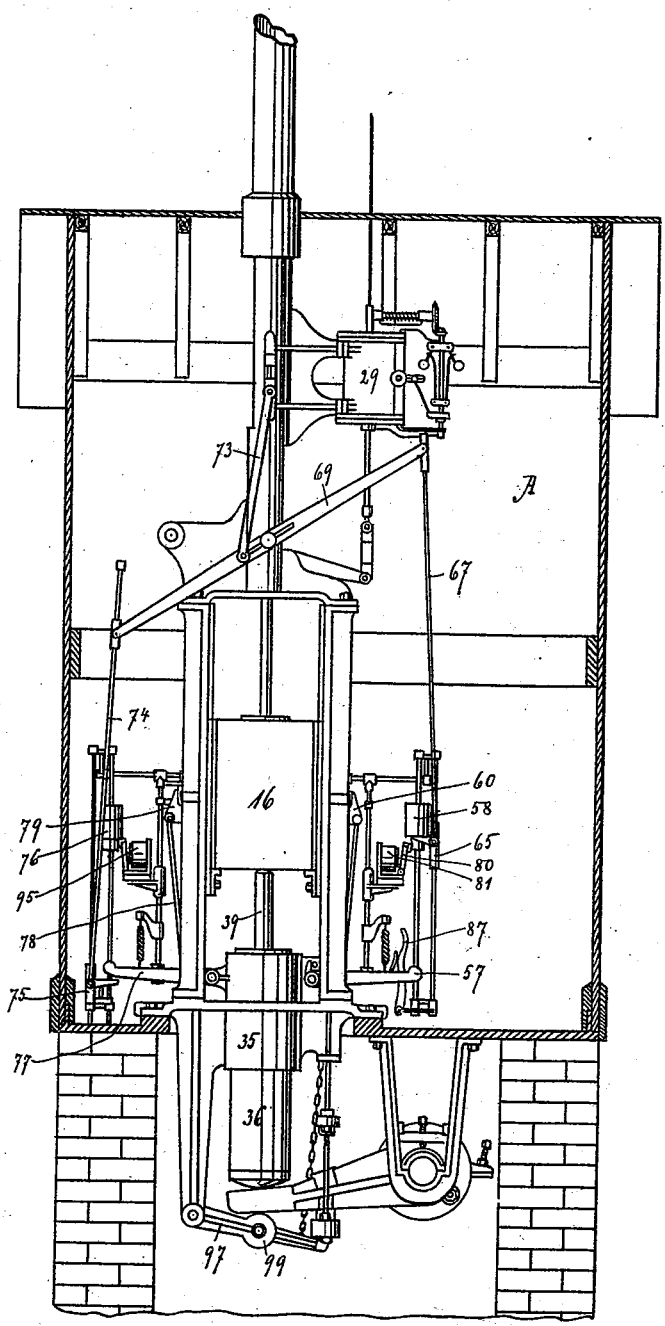
Figure 8:
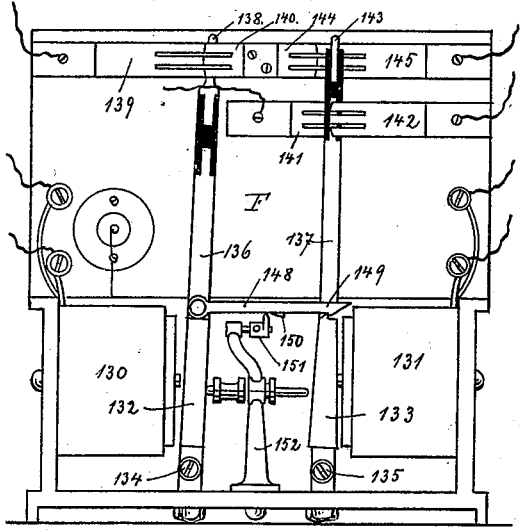
Figure 9:
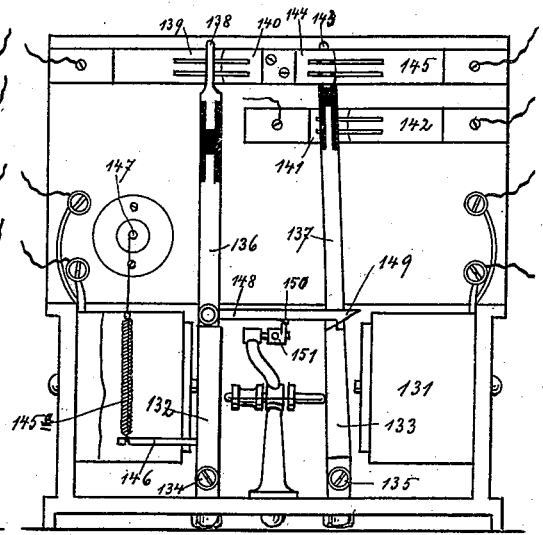
Figure 10:
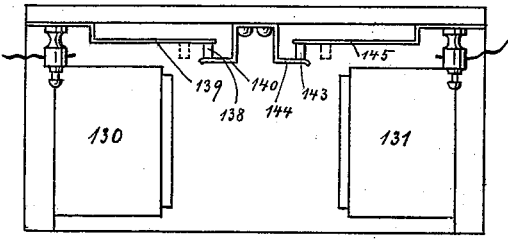
Figure 11:
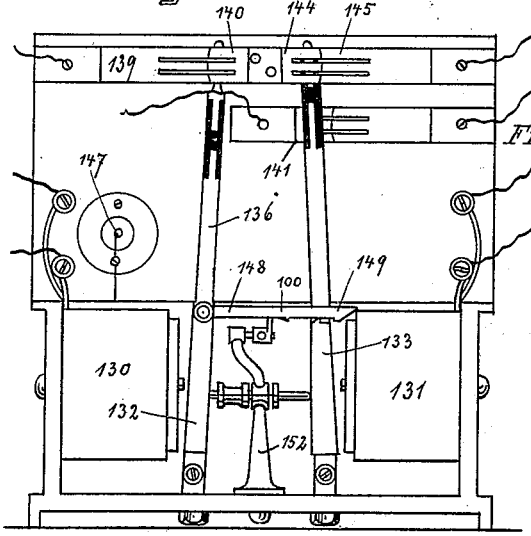
Figure 12:
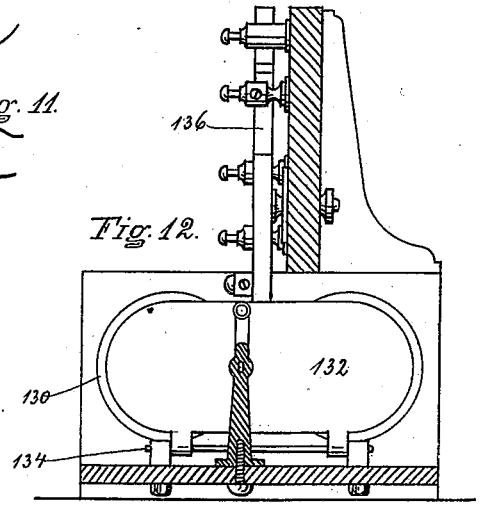

In the drawings, Figure 1 shows a general perspective view of my improved gate in closed position. Fig. 2 shows, in diagram, the circuits for operating the gate in connection with portions of the mechanism with which they are connected. Fig. 3 shows a vertical section of the power-house, showing the mechanism for controlling the movements of the gate in the position which they assume when the gates are open. The details of this figure vary slightly from those shown in Fig. 2, which slight variation will be hereinafter pointed out. Fig. 4 shows substantially the same as Fig. 3, with the parts in the position which they assume when the gates are closed. A small portion of this figure also differs from Fig. 3, which difference will be hereinafter pointed out and explained. Fig. 5 shows details, partially in cross-section, of a portion of the device which I designate "a pneumatic switch." Fig. 6 shows a side elevation of the parts shown in Fig. 5. Fig. 7 shows a top view of the same. Fig. 7$^a$ shows details pertaining to the same mechanism. Fig. 8 shows, in side elevation, a combination of electro-switching-magnets with the switching mechanism operated thereby in one of its several positions. Fig. 9 shows the same as shown in Fig. 8 in a different position of the switching-levers. One of the spools of one of the electromagnets in this figure is partially removed to show a spring and lever for operating one of the switching-levers. Fig. 10 shows a plan view of the device shown in Fig. 8, with portions of the details omitted. Fig. 11 shows the same as Fig. 8, with the parts in their normal position, neither electromagnet being charged. Fig. 12 is a vertical section of the device on the middle or central line. Fig. 13 shows the mechanism contained in the power-house for operating the gate, portions of the figure being shown in section to exhibit the internal construction. Fig. 14 shows details of the gate-post, gate, and mechanism at the post. Fig. 15 shows a plan view of the pivotal end of the gate in connection with a cross-section of the gate-post. Fig. 16 shows, in section, the housings or coverings of the connections between the several gates with the connections therein and the bell-crank levers located at the angle of the housings. Fig. 17 shows details of the tread-levers and connecting parts. Fig. 18 shows a plan view of the power-house and the shaft which extends through under the tracks to transmit the motion from the tread-levers to the power-house. Figs. 19 to 25, inclusive, show details of construction.

Referring to the reference letters and figures in a more particular description of the device, I provide adjacent to the highway-crossing by the side of the railway-tracks, what I term a "power-house" A, from which extend pipes or housings over the track, as shown at B, and over the highway, as shown at C and D to the several gate-posts 1, 2, 3, and 4 located on opposite sides of the highway and opposite sides of the railway. This provision is made for the use of four gates. In case of a lesser number being employed a lesser number of gate-posts would be used and the housings to the same extent dispensed with. The four gates shown in the drawings are indicated by 5, 5$^a$, 5$^b$, and 5$^c$ and are pivoted on rocking shafts 6 in the upper end of the gate-post so as to swing in a vertical manner. There is also provided a housing or covering, as 7, for each gate located in proper position and extending from the gate-post adjacent to the pivotal point of the gate up to the housings spanning the highway and secured thereto. The gates are adapted to be received within these casings or coverings and remain therein when in open position. In cases where the gate takes a vertical position when open the gate-casings are preferably dispensed with.

Each gate is provided with one or more counterweights, as shown at 8, in which there is a surplus of weight, so that the tendency of the gates is to stand open unless held in closed position. Secured on the gate-shaft 6 within the gate-post I provide a sector 9 to which is attached a flexible portion 10 of the connection 11, which connection extends through the several housings to the powerhouse. At the angles in the housings I provide bell-cranks 12 pivoted therein, by means of which the direction of movement is readily changed without material loss of power. The gates are preferably provided adjacent to the gate-post with a hinge, as shown at 13, which allows the gate to be forced open from the track outward in case a person is caught on the tracks; and there is provided for returning the gate to its normal position a spring 14. The connection 11 to the several gates where it enters the power-house is preferably first provided with a swivel-nut 15 by which the length of the connection can be adjusted. The connection thence passes down to the main weight 16, to which it is attached by having its headed end 17 passed into a socket or well 18 provided in the top of the weight, and it is secured by a screw-threaded bushing 19 secured in the top of the well. This provides for an independent movement of the weight with reference to the connection 11. The main weight 16 moves in a pair of guides 20 and 21 provided in the frame 22.

For regulating the speed of movement of the gates there is provided an arm 23, pivoted at 24 to the frame 22 and coupled at 25 to the gate connection 11. To the moving end of the lever-arm 23 is attached by a connecting-rod 26 a piston rod and head 27 and 28, respectively, which piston-head moves in the cylinder 29. In the walls of the cylinder 29 is provided an air-passage 30, which extends from one end of the cylinder to the other, and in this passage is located a valve 31 controlling the same, which valve is controlled or operated by governor 32. This governor is driven by the bevel-gears shown at 33 and and a gear $34^a$ on the shaft 34, which engages with a rack in the upper end $27^a$ of the piston-rod, and on shaft 34 is provided a spring $34^b$ for relieving the device in sudden stops and starts. In the base portion of the framework 22 is provided a sleeve 35, in which is placed the spring-barrel 36 capable of a vertical sliding movement, and this spring-barrel contains the main spring 37. In the upper end of the spring-barrel is provided a head 38, from which extends a push-post 39 through the upper head of the spring-barrel, adapted to engage on the under side of the main weight, preferably on its center or axial line. The lower end of the spring-barrel is provided with a thickened and rounded head 40, which rests upon one end of the walking-beam lever 41. This walking-beam lever is mounted upon a suitable base or bearing 42. Engaging upon the short arm of the lever 41 is a crank-like lever 43, secured upon the rocking shaft 44, which extends from the power-house through under the rails of the several tracks. The levers 41 and 43 with the mechanism immediately connected therewith is preferably inclosed within a pit or basement of the powerhouse, the floor-line of the power-house being indicated at F. For limiting the movement of the walking-beam lever 41 I inclose it within a yoke consisting of a pair of bolts or rods 45 extending from the base up on either side of the rod and provided with cross-bars 46 and 47, which are provided with rubber buffers or cushions, against which the enlargement of the bar indicated at 47 is adapted to strike and limit the movement of the lever and at the same time cushion the blow, if any.

At each of the rails of the track I couple to the shaft 44 a short crank-arm 48. This crank-arm is preferably contained in a box 49, which is coupled to the rail by suitable clamps, and also contains in either end a bearing for the shaft 44. Engaging on the end of the crank-arm 48 and passing from a position adjacent to the rail through an opening in the wall of the box 49, which constitutes a guide therefor, I provide a push-pin 50, to which are coupled a pair of tread-levers 51 51 lying adjacent to the outside of the rail R of the railway-track and extending in either direction from the push-pin and pivoted at their outer ends at 52 to fixtures on the rail or tie. The pivotal end of the lever is preferably somewhat below the horizontal plane of the rail.

The main weight 16 is secured in its elevated position by a catch 53 and in its lower position by a catch 54, adapted to engage in notch $54^a$ in the weight. The spring-barrel 36 is secured in its elevated position by a tooth-faced catch 55 engaging with a ratchet-toothed rack 56 secured on the spring-barrel. The catch 55 is withdrawn by a bell-crank lever 57, having a short arm engaging with the catch and a long arm projecting into position to receive the blow of the tripping-weight 58. The bell-crank lever 57 is pivoted at 59. For operating the catch 53 there is provided a bell-crank lever 60 pivoted to the frame at 61 and having a connecting-rod 62 connecting the bell-crank 60 with the long arm of the bell-crank 57. The tripping-weight 58 slides on a guide-rod 63, which, in the form of construction shown in Figs. 13, 3 and 4, is supported in connection with other parts by arms or rods 64 projecting from the frame 22, and in the form shown in Fig. 2 by cast framework, as indicated at $64^a$. The tripping-weight 58 is raised by a lifter 65, the body portion of which slides on guide-rod 66 and is provided with an arm which engages with rod 63. The lifter is operated by a lifting-rod 67, which extends to the upper portion of the framework and engages with a sleeve 68 on one end of rocking arm 69. On the end of the rod 67 is a head or nut 70 against which the sleeve engages in operating the lifter.

The details of the construction just described are varied somewhat in Fig. 2 by providing a swivel in the rod at 71. The rocking arm 69 is pivoted to the framework 22 at 72 and is operated by a connecting-rod 73 attached at its upper end to gate connection 11. With the opposite end of rocking arm 69 is connected in the same manner the lifting-rod 74 of lifter 75 for tripping-weight 76. Tripping-weight 76 is provided for operating catch 54 through the mechanism of lever 77, connecting-rod 78 and bell-crank lever 79. The weight 58 is held in position for operation by the pivoted armature 80 of electromagnet 81, the upper end of the armature acting as a catch upon which the weight rests when not otherwise held. The armature is weighted to hang out or away from the cores of the magnet when they are not charged. The magnet is mounted on support 82 adjustable along rod 83. Arranged in a similar manner there is provided an electromagnet 95 and its pivotal armature 96 for supporting weight 76. At the foot of guide-rod 63 is a catch 87 pivoted at 88 to a fixed part of the framework and provided with a projecting upper end adapted to be engaged with and operated by the weight 58 as it moves along the rod. The catch 87 is operated by a spring 89 and is adapted to receive the long arm of bell-crank lever 57 in its depressed position when the weight is down. The notch $87^a$ in the side of the catch is provided to receive the lever-arm and secure it. The lever-arm is moved to its normal position by a spring 90. A pin 91, projecting from one side of the main weight 16, carries a movable contact-piece 92 adapted, when the weight is in its lower position, to establish an electrical connection between contact-springs 94 and $94^a$ in the electrical circuit with electromagnet 95, which with its armature 96 controls the weight 76 in a similar manner to that described with reference to weight 58. Spring 93 holds lever 77 up when not struck down by weight 76.

For raising the main weight or putting the main spring under tension by hand-power I provide a lever 97 pivoted to a downwardly-projecting arm 98 of the framework, and on this lever is mounted a roller 99 adapted to engage under the end of walking-beam lever 41. For operating lever 97 I provide either a chain 100, as shown in Fig. 13, which is carried to any desired lever or roller mechanism for drawing on the chain, or a lever-handle 101, as shown in Fig. 2, which extends into the power-house in suitable position to be operated.

The alarm-bell 102 is operated by mechanism contained in the casing 103, and the mechanism is wound by the cord 104, which is attached at one end to the connection 11 between the weight and gates, and at the other wound on a spool 106 on the bell-shaft, the spool operating to wind the spring which runs the striker of the bell. A light weight 105 is provided on the cord to keep it from twisting or kinking. For controlling some of the electric circuits which are used in the operation of the gate I provide a pneumatic switching device mounted on a board or base E. This device consists of a cylinder 107, Figs. 5 and 6, provided with a piston-head 108 and rod 109 connected therewith. In the lower end of the cylinder 107 is provided a vent-opening 110 for regulating the movement of the piston by allowing the air to escape. The piston is supported in its elevated position by the armature-catch 111 of electromagnet 112, the edge of the armature engaging under an adjustable ferrule 113 provided on the piston-rod. Extending from the piston-rod 109 to the base or board E is an arm 114 fixed to the piston-rod and at the board running between a pair of guides 115 on the board. The arm 114 carries a projecting pin 116 which has a contact-block 117 adapted to establish electrical connection between contact-springs 118 and 119 when the piston with its attached mechanism is in its lower position. The pin or stem 116 is also adapted to engage between the contact-springs 120 and 121 mounted on the base when the parts are in the position shown in Figs. 5 and 6, but when they are above or below this position the electrical connection between the springs 120 and 121 is broken. In the circuit which controls the magnet that releases the alarm-bell and allows it to ring is provided a pair of contact-springs 122 and 123. Spring 123 is thrown out of engagement with spring 122 when the piston-rod 109 is in its elevated position by reason of the arm 114 thereof acting on the inclined block 124 and forcing the push-pin 125 to the right, as shown in Figs. 5 and $7^a$, forcing the spring out of contact as before stated. The push-pin 125 is contained in a sleeve 126 mounted on the base-board E. The piston 108 with its connecting mechanism is raised to its elevated position by the cord 127 which is attached at one end to the upper end of the piston-rod 109, and at the other end to the upper end of the piston-rod $27^a$ and passing over suitable pulleys is provided with a light weight 128 to keep the cord tight and free of knots or snarls.

In the construction shown in Fig. 2 the contacting devices for establishing the electrical circuit for releasing the bell are shown in slightly different form. In this instance there are two sets of springs, similar to 118 and 119, mounted on the base, as shown at 129, and on the projecting pin 116 two contacts similar to 117 are provided. For controlling the electrical circuits which have control of the gate I provide an electrical switching device, which device is indicated in general by the letter F. The electrical switching device consists of two electromagnets 130 and 131 set face to face and provided with armatures 132 and 133, respectively, pivoted at their lower edges at 134 and 135 to fixtures on the base. The armatures are provided with upwardly-extending arms 136 and 137, respectively. On the upper end of the arm 136 and insulated therefrom is provided a contact-piece 138, adapted to establish connection between circuit-springs 139 and 140. The upper end of the arm 137 is adapted to establish a connection between the contact-springs 141 and 142, and the contact-block 143, mounted on the end of the same arm and insulated therefrom, is adapted to establish electrical connection between contact-springs 144 and 145. The armature 133 with its arm 137 is adapted to remain in the position shown in Fig. 8 when not operated upon to place it in another position, and after being attracted by the magnet 131. The armature 132 with its arm 136 is adapted to be moved out or away from the magnet when not attracted thereby by the spring 145, secured at one end to arm 146, projecting between the coils of the magnet, and at the other end to the spindle-holder 147, by which the tension of the spring may be adjusted. Pivoted on the arm 136 is provided a pawl 148, the hooked end of which is adapted to engage on a ratchet-like tooth on the armature 133, and the length of the hook 148 is such that when the armature 133 is thrown up the hook will engage with and throw over the armature 133 with its arm and switching devices from the position shown in Fig. 8 to the position shown in Fig. 11. On the pawl 148 is provided an inclined projection 150, adapted to ride up on the adjustable tripping-block 151, adjustably mounted upon the upper end of standard 152. As the pawl 148 is moved with its armature toward magnet 130 it starts the armature 133 and its attached parts in the same direction; but as the armature 132 completes its movement to the left, as shown in Figs. 8 to 11, the projection 150 rides up on block 151 and throws the pawl out of engagement with armature 133, leaving the armature 133 free and independent of 132 to be attracted by magnet 131 when charged.

The operation of the device taken as a whole is as follows: In the diagrammatical view shown in Fig. 2 is shown the relative arrangement and connection of parts as applied to a two-track railroad. In a double-track railroad the trains usually move in opposite directions upon the different tracks, and the diagram is also arranged to this end. On each track to the side of the power-house or highway-crossing and at a sufficient distance from the crossing there is located a track-instrument marked No. 1 in the diagram shown, which is provided with mechanism for breaking the electrical circuit shown in dotted lines by $a$, $a'$, $a^2$, $a^3$, and $a^*$. Adjacent to the outlying instrument and on the side toward the highway-crossing is provided a second track-instrument No. 2, which is provided with mechanism operated by the movement of the train for breaking the electrical circuit mentioned above and passing through this instrument. Adjacent to the tread-levers 51 on the same track is located a track-instrument marked No. 1$^a$, which is provided with mechanism for closing the electrical circuit $e^*$, $e$, $e'$, $e^2$, and $e^{**}$, which passes through that instrument. The same relative arrangement is made with reference to each track. A train approaching on either track operates track-instrument No. 1 and closes the circuit passing through track-instrument No. 2, and the magnet 131 of instrument marked F', if on upper track, and F, if on lower track, as shown in Fig. 2, is charged by the battery No. 4 provided in the same circuit, and the armature 133 is moved over, breaking the electrical circuit between the contact-springs 144 and 145, which, however, at this time has no effect on the mechanism, except to place it in safety, but at the same time it establishes an electrical connection between contact-springs 141 and 142. This completes the circuit $b$ $b'$ $b^*$ $b^2$, or $b^3$ $b^4$ $b^*$ $b^2$, as the case may be, depending on which track the train is on, between battery No. 4 and magnet 112 of the pneumatic switching mechanism, which magnet, when charged, draws up its armature 111 and releases the piston-rod 109, the piston and the attached parts, which immediately begin to descend until they reach the lower limit of movement. As soon as the piston-rod begins to descend the part which operates contact-spring 123 and holds it out of engagement with spring 122 is released, and spring 123 engages spring 122, establishing the electrical circuit $c$ $c'$ $c^2$ which controls the bell. When the electrical circuit which controls the bell is established through battery No. 6, an electromagnet which holds the bell against the tension of the spring which operates it is energized by battery No. 6, which is charged and operates to release the bell which rings until the spring runs down. Immediately after the armature-catch 111 has been operated to release the movable parts of the pneumatic switch the arm 116, Fig. 5, passes out from between contact-springs 120 and 121 in the circuit $b^*$ $b^2$, &c., with the electromagnet 112, breaking the circuit at this point. The valve 110 of the cylinder of this pneumatic switch is adjusted so as to allow any desired interval to elapse between the time that the train strikes the outlying button or track-instrument and the time when the gates close. During this interval the alarm-bell rings continually. When the piston and attached parts of the pneumatic switch have nearly made the end of their downward movement, the contact-block 117 enters between the contact-springs 118 and 119 establishing an electrical circuit $g$ $g'$ $g^2$, including electromagnet 81 and battery No. 4. Magnet 81 thus becoming energized, attracts its armature 80 and releases tripping-weight 58. Weight 58 drops down the guide-rod 63 and strikes the arm of lever 57, withdrawing the catch 55 and the catch 53. Lever 57 is caught and held down by catch 87. When the catch 55 is withdrawn, the spring-barrel is given a sudden "kick" downward. This is caused by the spring 37, which had been held under some tension and is allowed for by the clearance between the piston or plunger head 38 and the cap of the spring-barrel. In other words, the range of movement of the plunger of the spring-barrel is greater than the limits of movement of the main weight. The kick of the spring-barrel is useful in starting the tread-levers and connections extending thereto, especially if any of the parts are frozen up or stick. After the catches 53 and 55 are released, the main weight, with the spring, spring-barrel, &c., descend by their own gravity and at the same time elevate the tread-levers beside the rails operating through the levers 41 and 43 and rocking shaft 44 and the several parts at the rails of the track. As the main weight descends, it also draws on the rod or connection 11 extending to the several gates and the gates are closed. The closing movement is regulated by the pressure of air on the lower side of plunger 28 of cylinder 29. As the gates start to close, the air in the lower part of the piston passes readily through duct 30 to the opposite end; but as the gates attain speed the governor 32 operates the valve 31 to more or less close the duct and thus regulate the speed of movement. The downward movement of the main weight is limited by stops 153 and it is caught and held there by catch 54. At the time that the main weight descends the lever 69 is moved from the position shown in Fig. 13 to the position shown in Fig. 4. This operates the weight-lifter 65 to carry the weight above the armature-catch 80, and as the weight passes the end of catch-arm 87 the lever 57 is released, releasing in turn the catches 53 and 55; also at the same time weight-lifter 75 is moved to its lower limit of movement, leaving the releasing tripping-weight 76 held in operative position by armature-catch 96. At the time that the main weight descends the piston-rod 109 with its attached parts is drawn up by means of cord 127 and held suspended thereby above the armature-catch 111 while the weight 16 is in its lower position and the gates are closed. The parts remain in the several positions just described until the train reaches the tread-levers adjacent to the power-house, which it depresses, elevating the spring-barrel and compressing the spring, leaving the parts in the position shown in Fig. 19. Substantially at the same time that the train passes the tread-levers track-instrument No. $1^a$ closes the circuit $e^*$, $e$, $e'$, $e^2$, and $e^{**}$ through magnet 130 of one or the other of the electrical switching devices F or F', as the case may be, depending on the track on which the train is passing. This draws over the switching-arm 136, breaking the contact between springs 139 and 140, and also draws over switching-arm 137, breaking the contact between springs 141 and 142 and establishing contact between springs 144 and 145. The length of the pawl 148 and its adjustment is such that the contact between springs 139 and 140 is broken before the contact between springs 144 and 145 is established. With the same movement the pawl 148 rides up on knocking-out block 151 and frees the switching-arm 137 with its armature, so that it is capable of independent movement. While the train is passing track-instrument No. $1^a$ the circuit $e^*$, $e$, $e'$, $e^2$ and $e^{**}$ is held closed, but after the train has left the track-instrument it operates to break the circuit passing through this instrument and magnet 130 is de-energized and the spring 145 operates to throw the switching-arm 136 over to establish contact between springs 139 and 140. When this contact is established, the circuit $d$, $d'$, $d^2$, $d^3$ and $d^4$ is established through spring 139, tripping-magnet 95, battery No. 5, spring 145 and the other several springs at the top of instrument F or F', as the case may be. It should be noted here that when the weight 116 is in its lowest position a contact is established by block 92 between contact-springs 94 and $94^a$, which form a part of the circuit just mentioned. When the magnet 95 is energized, as just described, it attracts armature 96 and releases the tripping-weight 76, which falls down the guide-rod and strikes the lever 77, withdrawing the catch 54 from the main weight, which immediately is caused to ascend by the tension of the main spring. In ascending slack is given to the connecting-rod 11 and the gates simultaneously open by reason of being counterweighted with the surplus of weight in the counterweight. The opening movement of the gate is also regulated by the air-pressure in the regulating-cylinder 29, controlled by the governor, as before described. At the time that the gate opens the balancing-lever 69 is operated from the position shown in Fig. 4 to the position shown in Figs. 2 and 13, at the same time carrying the weight 76 up its guide-rod to a position above the armature-catch 96 where it is held in safety during the time that the gate stands open. With the same movement the lifter 65 is passed down its guide-rod, leaving the tripping-weight 58 supported on its armature-catch 80 ready for operation.

In case that one train follows another very closely, or an excessively-long train overlaps track-instrument No. $1^a$ at the gate and the outlying track-instruments Nos. 1 and 2, the gates are not affected, but remain continuously down until the last car of the train has passed off from track-instrument No. $1^a$, when the gates are allowed to open. In case a train enters on another track while the train is within the limits of the outlying track-instruments the operation of the gate is not affected, as the circuit which allows the gate to open is broken either by the switching-instrument F or F', and the circuit which controls the tripping-weight that allows the gate to open is kept broken until the last car of the last train within the limits of the outlying instrument has passed off from one or the other of the track-instruments No. 1ᵃ adjacent to the crossing. This is a great advantage, as much wear and tear of the gate is obviated.

It is evident that very many variations, changes and modifications in and from the construction herein described may be made without departing from the equivalents of my construction. It is also evident that the apparatus may with very little modification and change be adapted to use as a signal apparatus, the signals being substituted and operated in lieu of the gates. In case of use as a signal certain parts may be dispensed with and others it would be found desirable to slightly modify.

What I claim as new, and desire to secure by Letters Patent, is—

1. The combination of a railway gate, a weight for operating the gate, a catch securing the weight, a falling weight for tripping the catch, an electro-magnet catch securing the tripping weight a circuit maker at the railway track in circuit with the electro-magnet catch, substantially as set forth.

2. The combination in a railway gate or signal, of mechanism for operating the gate, a catch for securing the mechanism with the gate in open position, a tripping mechanism for the catch, an electro-magnet catch securing the tripping mechanism located in a local circuit, an electrically operated switch controlling the local circuit, two electro-magnets for operating the switch in opposite directions and a track instrument in each of the circuits controlling the electric switch, substantially as set forth.

3. The combination in a mechanism for controlling the movements of a railway gate or signal, of the track instruments No. 1, No. 1ᵃ and No. 2, and compound electric switches F and F', and the catch and tripping mechanism arranged and connected substantially as set forth.

4. The combination of a gate operating mechanism, a catch for securing the mechanism, a tripping weight, a guide for the tripping weight, a catch operating lever 57 projecting into position to be struck by the tripping weight, and a curved catch lever 87 therefor arranged to be operated by the passage of the tripping weight along the guide, substantially as set forth.

5. The combination in a railway gate or signal and the mechanism for operating the same, of a tripping mechanism and an electro-magnet catch for controlling the same, a pneumatic time switch E, a compound electric switch F, the circuits $g^2$, $g'$ and $g$ between the electro-magnet catch and the time switch, the circuits $B^*$, $B^4$ and $B^3$ between the time switch and the electric switch F, two electro-magnets 130 and 131, of the electric switch and the circuits $e'$, $e^2$, $e^*$ and $e^{**}$, including the magnet 130, and a track instrument, and the circuits $a^5$, $a^2$, $a'$, $a^*$ including the magnet 131 and two track instruments being a circuit maker and a circuit breaker respectively, substantially as set forth.

6. The combination in a railway gate and operating mechanism of catches for securing the mechanism with the gates in open and closed position respectively, the electro-magnet catch 81 controlling the catch for securing the mechanism in open position, the time switch E, the circuit $g$, $g'$ and $g^2$ including the catch 81 and the contact pins on the time switch, the compound electric switches F and F', the circuit connecting the two electric switches with the time switch and the three track instruments connected with the switch F and the three track instruments connected with the switch F', the electro-magnet catch 95 controlling the catch securing the gates in closed position and the connections between said electro-magnet and the switches F and F', substantially as set forth.

In witness whereof I have affixed my signature in presence of two witnesses.

GEO. A. REYNOLDS.

Witnesses:
H. J. COOKINHAM,
ARTHUR SAVAGE.